US012686365B2

(12) United States Patent
Ferguson et al.

(10) Patent No.: US 12,686,365 B2
(45) Date of Patent: Jul. 21, 2026

(54) AUTOMATED FLEET-CONNECTED CLEANING AND INSPECTION SYSTEM

(71) Applicant: GM Cruise Holdings LLC, San Francisco, CA (US)

(72) Inventors: Kenneth Ferguson, Scottsdale, AZ (US); Jeffrey Brandon, Phoenix, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 286 days.

(21) Appl. No.: 18/296,846

(22) Filed: Apr. 6, 2023

(65) Prior Publication Data

US 2024/0336234 A1 Oct. 10, 2024

(51) Int. Cl.
*B60S 3/00* (2006.01)
*A47L 7/00* (2006.01)
*A47L 9/24* (2006.01)
*A47L 9/28* (2006.01)

(52) U.S. Cl.
CPC ............. *B60S 3/008* (2013.01); *A47L 7/0076* (2013.01); *A47L 9/242* (2013.01); *A47L 9/2805* (2013.01); *A47L 2201/04* (2013.01); *A47L 2201/06* (2013.01)

(58) Field of Classification Search
CPC ........ B60S 3/008; A47L 7/0076; A47L 9/242; A47L 9/2805; A47L 2201/04; A47L 2201/06
See application file for complete search history.

(56) References Cited

U.S. PATENT DOCUMENTS

| | | | | |
|---|---|---|---|---|
| 11,548,159 | B1 * | 1/2023 | Ebrahimi Afrouzi | ..... G06T 7/13 |
| 2002/0121291 | A1 * | 9/2002 | Daum | ..................... B60S 3/008 |
| | | | | 134/123 |
| 2009/0272409 | A1 * | 11/2009 | Petit | ......................... B05B 3/14 |
| | | | | 239/548 |
| 2010/0186778 | A1 * | 7/2010 | Martin | ................... B08B 3/024 |
| | | | | 134/113 |
| 2017/0210353 | A1 * | 7/2017 | Stauffer | .................... B60S 1/64 |
| 2017/0368579 | A1 * | 12/2017 | Prus | ..................... B25J 11/0085 |
| 2020/0031248 | A1 * | 1/2020 | Kwak | ..................... B60L 53/16 |
| 2024/0336234 | A1 * | 10/2024 | Ferguson | ................ B60S 3/008 |

FOREIGN PATENT DOCUMENTS

| | | | | |
|---|---|---|---|---|
| CN | 206484560 | * | 9/2017 | |
| CN | 109278716 | * | 1/2019 | |
| CN | 112073523 | * | 12/2020 | |
| WO | WO-2020126830 A1 | * | 6/2020 | .......... B25J 19/0029 |

* cited by examiner

*Primary Examiner* — Alexander Markoff
(74) *Attorney, Agent, or Firm* — Honigman LLP; Matthew H. Szalach

(57) ABSTRACT

Systems and methods for automated cleaning and inspection of electric vehicles. The systems and methods for automated cleaning eliminate the need for human interaction with the vehicle and/or cleaning system. Vehicle cleaning is typically a heavily manual task that consumes operation personnel time and resources. Providing automated systems and methods for vehicle cleaning can reduce human resources used for cleaning. Additionally, automated cleaning systems and methods can increase vehicle utilization efficiency by decreasing downtime for cleaning. In various implementations, systems and methods are provided for automated vehicle inspections. In some examples, automated vehicle inspections can occur concurrently with automated vehicle cleaning.

12 Claims, 12 Drawing Sheets

100 120

120

200

300

400

500

700

800

900

1000

AUTOMATED FLEET-CONNECTED CLEANING AND INSPECTION SYSTEM

CROSS-REFERENCE TO RELATED APPLICATIONS

This application is related to U.S. Non-Provisional Patent Application entitled "Automated Fleet-Connected Charging System", filed concurrently herewith, the contents of which are incorporated herein by reference in their entirety and for all purposes.

BACKGROUND

1. Technical Field

The present disclosure generally relates to vehicle charging and, more specifically, to electric vehicle charging systems.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
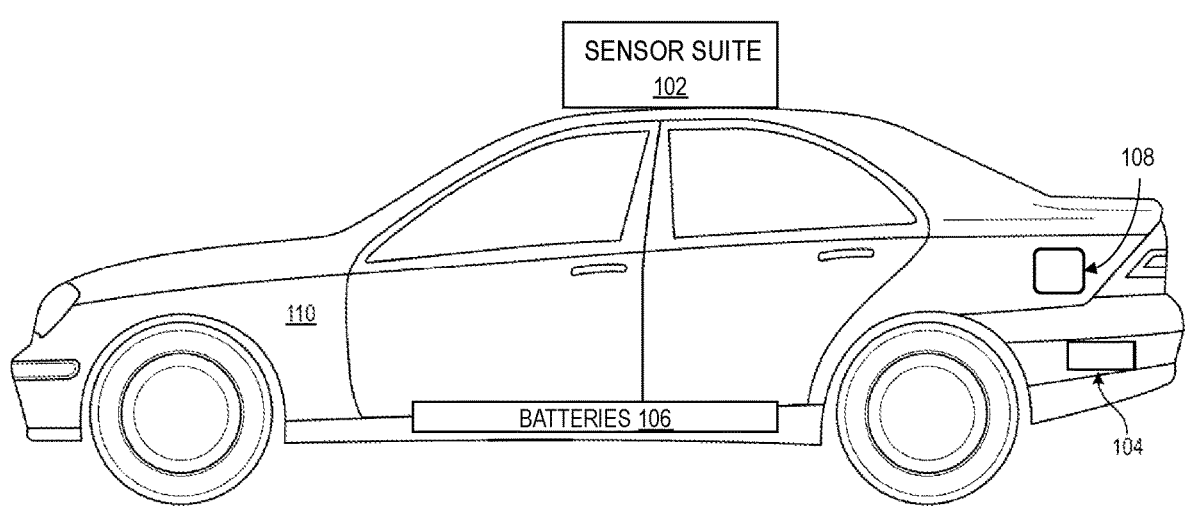
FIGS. 1A, 1B illustrate autonomous vehicles for automated charging, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Systems and methods are provided for automated cleaning and inspection of electric vehicles. The systems and methods for automated cleaning eliminate the need for human interaction with the vehicle and/or cleaning system. Vehicle cleaning is typically a heavily manual task that consumes operation personnel time and resources. Providing automated systems and methods for vehicle cleaning can reduce human resources used for cleaning. Additionally, automated cleaning systems and methods can increase vehicle utilization efficiency by decreasing downtime for cleaning. In various implementations, systems and methods are provided for automated vehicle inspections. In some examples, automated vehicle inspections can occur concurrently with automated vehicle cleaning.

A system is provided for detecting a vehicle cleanliness issue and directing the vehicle to a cleaning facility. At the vehicle cleaning facility, a robotic cleaning system is provided for cleaning the vehicle. The robotic cleaning system can clean the vehicle exterior, and the robotic cleaning system can autonomously access a vehicle interior and clean the vehicle interior. In various examples, the robotic cleaning system can autonomously determine cleaning configuration parameters for the cleaning, such as vacuum nozzle selection, different wiping mechanisms, sponges, and different types of cleaning solutions.

In some implementations, the robotic cleaning system is connected to a vehicle fleet via a dispatch system, and the dispatch system can provide detailed information to the cleaning system regarding a vehicle that is scheduled to arrive at the cleaning facility for cleaning. In some examples, the dispatch system can determine where to position an incoming vehicle in a cleaning facility based on the vehicle state and/or the cleaning system state. In some examples, cleaning facility systems can determine where to position an incoming vehicle in a cleaning facility based on the vehicle state and/or the robotic cleaning system state. In some implementations, the cleaning facility system is a standalone system that monitors the cleaning facility environment to determine where to position an incoming vehicle for cleaning. In further examples, a vehicle can pull into any empty cleaning space, and the cleaning system identifies the new vehicle via sensors at the cleaning space.

Similarly, a system is provided for providing vehicle inspections. At the vehicle inspection facility, a robotic inspection system is provided for inspecting the vehicle. The robotic inspection system can inspect the vehicle exterior, and the robotic inspection system can autonomously access a vehicle interior and inspect the vehicle interior. In various examples, the robotic inspection system can autonomously determine inspection configuration parameters for the inspection. In some examples, the robotic inspection system is combined with the robotic cleaning system in one robotic system that can perform both inspections and cleanings.

In some implementations, the robotic inspection system is connected to a vehicle fleet via a dispatch system, and the dispatch system can provide detailed information to the inspection system regarding a vehicle that is scheduled to arrive at the inspection facility for an inspection. In some examples, the dispatch system can determine where to position an incoming vehicle in an inspection facility based on the vehicle state and/or the inspection system state. In some examples, inspection facility systems can determine where to position an incoming vehicle in an inspection facility based on the vehicle state and/or the robotic inspection system state. In some implementations, the inspection facility system is a standalone system that monitors the inspection facility environment to determine where to position an incoming vehicle for inspection. In further examples, a vehicle can pull into any empty inspection space, and the inspection system identifies the new vehicle via sensors at the inspection space.

Example Vehicle for Automated Cleaning and Inspections

Figure 1B:
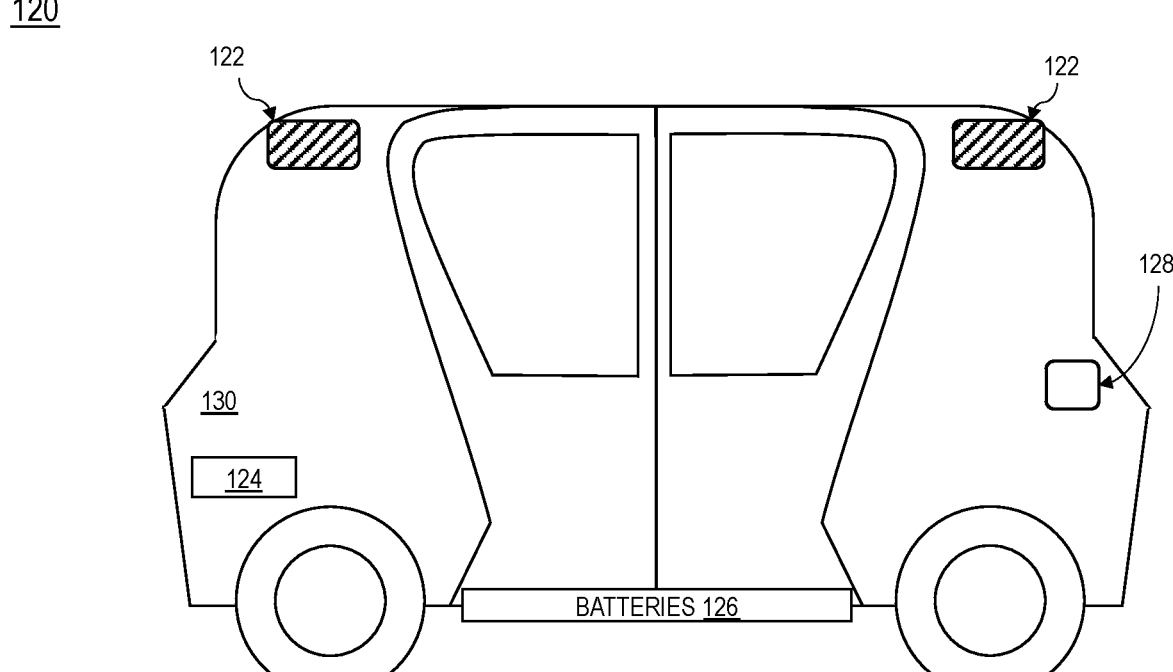

FIGS. 1A-1B illustrate autonomous vehicles 110, 130 for automated cleaning and inspections, according to some examples of the present disclosure. The autonomous vehicle 110 includes a sensor suite 102 and an onboard computer 104, and the autonomous vehicle 130 includes sensor suites 122 and an onboard computer 124. In various implementations, the autonomous vehicles 110, 130 uses sensor information from the sensor suites 102, 122 to determine vehicle location, to navigate traffic, to sense and avoid obstacles, and to sense vehicle surroundings. According to various implementations, the autonomous vehicles 110, 130 are part of a fleet of vehicles for picking up passengers and/or packages and driving to selected destinations. In some examples, the autonomous vehicles 110, 130 are personal autonomous vehicles that are used by one or more owners for driving to selected destinations. In some examples, the autonomous vehicles 110, 130 can connect with a central computer to download vehicle updates, maps, and other vehicle data. The autonomous vehicles 110, 130 each include a charging port 108, 128, respectively. The location of the charging port 108, 128 can vary depending on the model of the vehicle 110, 130. A charger can be connected to the charging ports 108, 128 to charge the batteries 106, 126 of the vehicles 110, 130. The autonomous vehicles 110, 130 can be configured for autonomous cleaning and inspections. In some examples, the autonomous vehicles 110, 130 can communicate with a robotic cleaning system. In some examples, the autonomous vehicles 110, 130 can communicate with a robotic inspection system.

The sensor suites 102, 122 include localization and driving sensors. For example, the sensor suite 102 may include one or more of photodetectors, cameras, RADAR, sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suites 102, 122 continuously monitor the autonomous vehicle's environment. In particular, the sensor suites 102, 122 can be used to identify information and determine various factors regarding an autonomous vehicle's environment. In some examples, data from the sensor suite 102, 122 can be used to update a map with information used to develop layers with waypoints identifying various detected items, such as locations of roadside shelters. Additionally, sensor suite 102, 122 data can provide localized traffic information, ongoing road work information, and current road condition information. Furthermore, sensor suite 102, 122 data can provide current environmental information, including current roadside environment information, such as the presence of people, crowds, and/or objects on a roadside or sidewalk. In this way, sensor suite 102, 122 data from many autonomous vehicles can continually provide feedback to the mapping system and a high fidelity map can be updated as more and more information is gathered.

In various examples, the sensor suite 102, 122 includes cameras implemented using high-resolution imagers with fixed mounting and field of view. In further examples, the sensor suite 102, 122 includes LIDARs implemented using scanning LIDARs. Scanning LIDARs have a dynamically configurable field of view that provides a point cloud of the region intended to scan. In still further examples, the sensor suite 102, 122 includes RADARs implemented using scanning RADARs with dynamically configurable field of view.

The autonomous vehicles 110, 130 each include an onboard computer 104, 124 which functions to control the autonomous vehicle 110, 130. The onboard computer 104, 124 processes sensed data from the sensor suite 102, 122 and/or other sensors, in order to determine a state of the autonomous vehicle 110, 130. Additionally, the onboard computer 104, 124 processes data for charging, and can use sensor suite 102,122 data for identifying a charging space in a charging facility. In some examples, the onboard computer 104,124 checks for vehicle updates from a central computer or other secure access point. In some examples, a vehicle sensor log receives and stores processed sensed sensor suite 102, 122 data from the onboard computer 104, 124. In some examples, a vehicle sensor log receives sensor suite 102, 122 data from the sensor suite 102, 122. The vehicle sensor log can be used to determine a state of a vehicle and various maintenance items such as charging, cleaning, and potential vehicle damage. In some implementations described herein, the autonomous vehicles 110, 130 include sensors inside the vehicle. In some examples, the autonomous vehicles 110, 130 include one or more cameras inside the vehicle. The cameras can be used to detect trash in the vehicle, and the cameras can also be used to detect stains or other cleanliness issues in the vehicle. Similarly, the cameras can be used to detect potential damage to the vehicle, such as abrasions or cuts to vehicle seats, or vehicle surfaces, or vehicle seat belts. In some examples, various sensors in the vehicles 110, 130 can detect whether a sensor is obscured. For instance, a sensor in the vehicle 110, 130 can determine whether it is obscured by dirt and/or whether another sensor is obscured by dirt. The cameras can be used to detect items or people inside the vehicle. In some examples, the autonomous vehicles 110, 130 include one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104, 124 controls and/or modifies driving behavior of the autonomous vehicle 110, 130.

The onboard computer 104, 124 functions to control the operations and functionality of the autonomous vehicle 110, 130 and processes sensed data from the sensor suite 102, 122 and/or other sensors in order to determine states of the autonomous vehicle. In some implementations, the onboard computer 104, 124 is a general purpose computer adapted for I/O communication with vehicle control systems and sensor systems. In some implementations, the onboard computer 104, 124 is any suitable computing device. In some implementations, the onboard computer 104, 124 is connected to the Internet via a wireless connection (e.g., via a cellular data connection). In some examples, the onboard computer 104, 124 is coupled to any number of wireless or wired communication systems. In some examples, the onboard computer 104, 124 is coupled to one or more communication systems via a mesh network of devices, such as a mesh network formed by autonomous vehicles.

According to various implementations, the autonomous driving systems 100, 120 of FIGS. 1A, 1B function to enable an autonomous vehicle 110, 130 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110. 130 is preferably a fully autonomous automobile, but may additionally or alternatively be any semi-autonomous or fully autonomous vehicle. In various examples, the autonomous vehicle 110, 130 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110, 130 includes a throttle interface that controls an engine throttle, motor speed (e.g., rotational speed of electric motor), or any other movement-enabling mechanism. In various implementations, the autonomous vehicle 110, 130 includes a brake interface that controls brakes of the autonomous vehicle 110, 130 and controls any other movement-retarding mechanism of the autonomous vehicle 110, 130. In various implementations, the autonomous vehicle 110, 130 includes a steering interface that controls steering of the autonomous vehicle 110, 130. In one example, the steering interface changes the angle of wheels of the autonomous vehicle. The autonomous vehicle 110, 130 may additionally or alternatively include interfaces for control of any other vehicle functions, for example, windshield wipers, headlights, turn indicators, air conditioning, etc.

System for Automated Cleaning and Inspections

Figure 2:
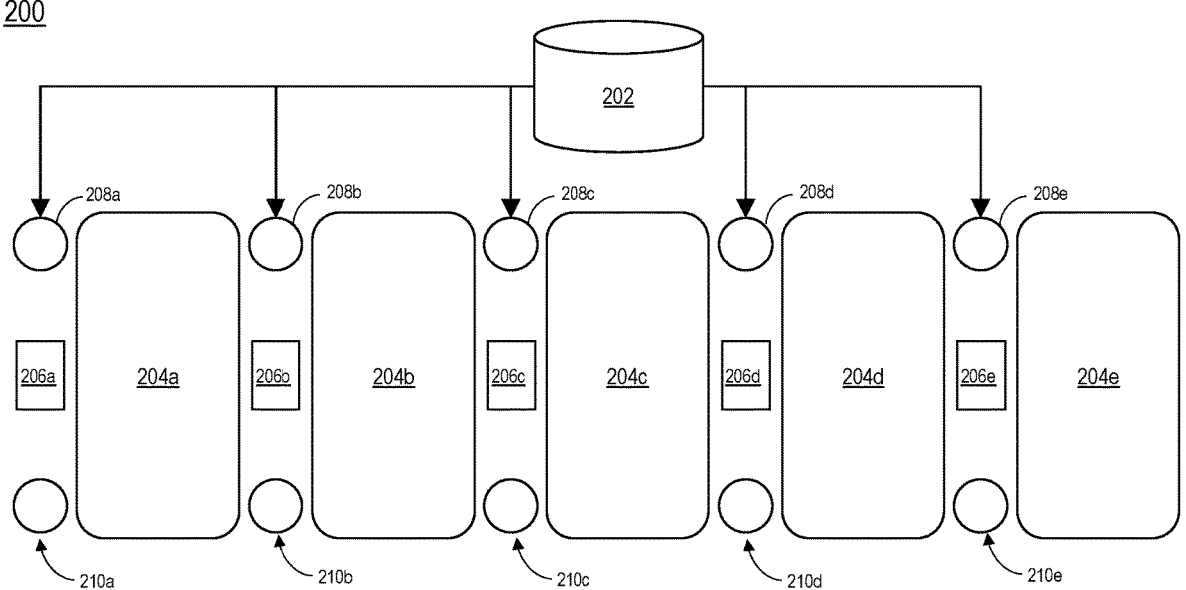
FIG. 2 illustrates a robotic cleaning facility system 200 for automated vehicle cleaning, according to some examples of the present disclosure.

FIG. 2 illustrates a robotic cleaning facility system 200 for automated vehicle cleaning, according to some examples of the present disclosure. In various implementations, the robotic cleaning facility system 200 can also be used for automated inspections. The cleaning facility system 200 includes five vehicle parking spots 204a-204e, each parking spot 204a-204e having a corresponding robotic cleaner 206a-206e. The cleaning facility system 200 includes a vacuum canister 202. In some examples, the vacuum canister 202 provides vacuum functionality to each of multiple vacuum modules 208a-208e. In various examples, each of the vacuum modules 208a-208e includes multiple end effectors, providing multiple different vacuum configuration options. The end effectors can include, for example, a crevice cleaner, an upholstery wand, a dusting brush, a power brush, a wedge-shaped attachment, and other vacuum attachments. In various examples, the robotic cleaners 206a-206e can attach the appropriate end effector on the corresponding vacuum modules 208a-208e to address the various cleaning goals for a vehicle parked in the corresponding parking spot 204a-204e. In some examples, each vacuum module 208a-208e includes a hose end, and the robotic cleaners 206a-206e can attach the appropriate end effector on to the corresponding vacuum hose. In some examples, vacuum hoses are positioned underneath a floor of the cleaning facility system 200, and vacuum ends emerge at each vacuum module 208a-208e, thereby minimizing the length of vacuum hose visible within the robotic cleaning facility system 200. The robotic cleaners 206a-206e can grab or otherwise secure the vacuum hose. During a vehicle cleaning, the robotic cleaners 206a-206e can switch the vacuum end effectors to reconfigure the vacuum modules 208a-208e. In some implementations, each vacuum module 208a-208e includes its own vacuum canister. In some implementations, each robotic cleaner 206a-206e includes a vacuum module 208a-208e with a vacuum canister. In some implementations, each vacuum module 208a-208e shares a vacuum canister with one or two other vacuum modules 208a-208e.

In some examples, when a vehicle parks in a parking spot 204a-204e for cleaning, a robotic cleaner 206a-206e next to the vehicle presses a door-opening button to open a vehicle door. In some examples, the robotic cleaners 206a-206e include a sensor system to determine where the vehicle doors are and where vehicle door-opening buttons are. The sensor system can be used to execute steps to select an appropriate end effector and press a door-opening button. In various examples, the sensor system includes one or more of LIDAR sensors, RADAR sensors, and image sensors (e.g., a camera). In various examples, the sensor system can be used to perform vehicle inspections, as described in greater detail below and also with respect to FIG. 4.

The cleaning facility system 200 includes multiple cleansing modules 210a-210e, which can include configurations and end effectors for spraying, wiping, scrubbing, and other cleaning needs. In one example, a spraying end effector accesses a reservoir of cleaner in the respective cleansing module 210a-210e, and the respective robotic cleaner 206a-206e doses the spray according to identified cleaning goals. The respective robotic cleaner 206a-206e can use an appropriate cleaning end effector with the spray to wipe and/or scrub a surface. The cleansing modules 210a-210e each have multiple cleaning end effectors can include rags, sponges, dusters, brushes, sprayers, suction attachments, and other cleaning attachments. Additionally, each cleansing module 210a-210e can include multiple reservoirs of various cleaning solutions as well as a reservoir of water. In some examples, each cleansing module 210a-210e has an incoming water supply. Similarly, in some examples, each cleansing module 210a-210e has a drain. In one example, a suction attachment end effector can be used to remove liquid (including liquid used by a robotic cleaner 206a-206e) and the suctioned liquid can be expelled via a cleaning module drain.

In some examples, the robotic cleaners 206a-206e can be upright cleaners attached to a stationary base on the floor of the cleaning facility. In some examples, the robotic cleaners 206a-206e can be overhead drop-down cleaners attached to a stationary base hanging from a cleaning facility ceiling. In some examples, the robotic cleaners 206a-206e are mobile, and can move along a track, such as a floor rail or an overhead gantry track. In some examples, the floor rail or overhead gantry track is a linear track located next to the parking spot. In some examples, the floor rail or overhead gantry track includes track portions in front of and/or behind the parking spot. In some examples, the floor rail and/or overhead gantry track includes track portions surrounding the parking spot on all sides, allowing the robotic cleaner 206a-206e to travel to any side of the vehicle. In some examples, the robotic cleaners 206a-206e can move independently on a wheeled base. In some examples, the robotic cleaners 206a-206e are r2d2-style robots. The robotic cleaners 206a-206e can include a robotic arm configured to grasp or otherwise secure a vacuum and/or cleaning end effector, and maneuver the end effector throughout the interior and exterior of the vehicle. In some examples, an additional robotic cleaner is located on the right side of the parking spot 204e.

In some examples, a dual robotic cleaning system can be employed, in which two robotic cleaners 206a-206e are used per vehicle. In particular, the robotic cleaners 206a-206e on either side of a vehicle can both be used to clean the vehicle. For example, robotic cleaners 206a, 206b can both simultaneously clean a vehicle parked in the parking spot 204a. In some examples, one robotic cleaner 206a-206e can clean the exterior of a vehicle while another robotic cleaner addresses the interior of the vehicle. In some examples, a dual robotic cleaning system reduces the total time it takes to clean a vehicle. For instance, a dual robotic cleaning system may clean a vehicle in half the time it takes a single robotic cleaning system to clean the vehicle. In some examples, the use of a dual robotic cleaning system can depend on robotic cleaner 206a-206e availability, on vehicle cabin conditions, and/or on vehicle exterior condition. In some examples, robotic cleaning system configuration is selected to minimize total cleaning time for a vehicle and return the vehicle to service. In some examples, an electric vehicle is cleaned by a robotic cleaning system 200 while the vehicle is charging, and the cleaning is timed to be completed when (or before) vehicle charging is complete.

In some examples, the robotic cleaners 206a-206e can also function as robotic inspectors. In some examples, an end effector for robotic inspections can include a camera at the distal end of a robotic arm. The robotic arm can be a cleaning end effector that also includes the camera for inspections, and inspections can be completely concurrently with automated cleanings. In some examples, vehicle inspections can be completed by following a sequence of movements. The sequence of movements can be specific to the model of the vehicle being inspected. In various examples, an automated cleaning can be targeted to a specific cleanliness issue and the cleaning can be supplemented with a more thorough inspection.

In some implementations, the automated cleaning and/or automated inspections are performed on a vehicle configured for deliveries. A cargo box or other delivery container can be installed in a vehicle, and the delivery container can be cleaned with the robotic cleaning system. In various examples, delivery container cleaning can include vacuuming, spraying, wiping, and scrubbing, similar to other vehicle cleanings. Delivery container inspections can include inspections of delivery container integrity, delivery container temperature control functions, delivery container opening and closing functions, and delivery container locking and unlocking functions.

In various implementations, the cleaning facility system 200 can communicate directly with a vehicle being cleaned and/or inspected. Similarly, in some implementations and/or the robotic cleaners 206a-206e can communicate directly with a vehicle being cleaned and/or inspected. Communication can include transmitting and receiving data such as instructions and images. Communication can include presenting a signal (e.g., a light and/or an audio signal) that is perceived and recognized by the other system.

While the cleaning facility system 200 presents an example in which cleaning spots are co-located, in other examples, vehicles can be distributed within a facility and mobile robotic cleaners 206a-206e move around within the facility to travel to the vehicles requesting cleaning and autonomously clean the vehicles. The robotic cleaners 206a-206e can be AGV or other mobile robotic cleaners 206a-206e, and a fleet management and/or dispatch system can transmit instructions to the robotic cleaners 206a-206e including vehicle locations and cleaning requests. In some examples, the robotic cleaners 206a-206e can bring cleaning supplies. In some examples, cleaning supplies can be positioned at various locations around the facility and accessible to the robotic cleaners 206a-206e.

Method for Automated Cleaning

Figure 3:
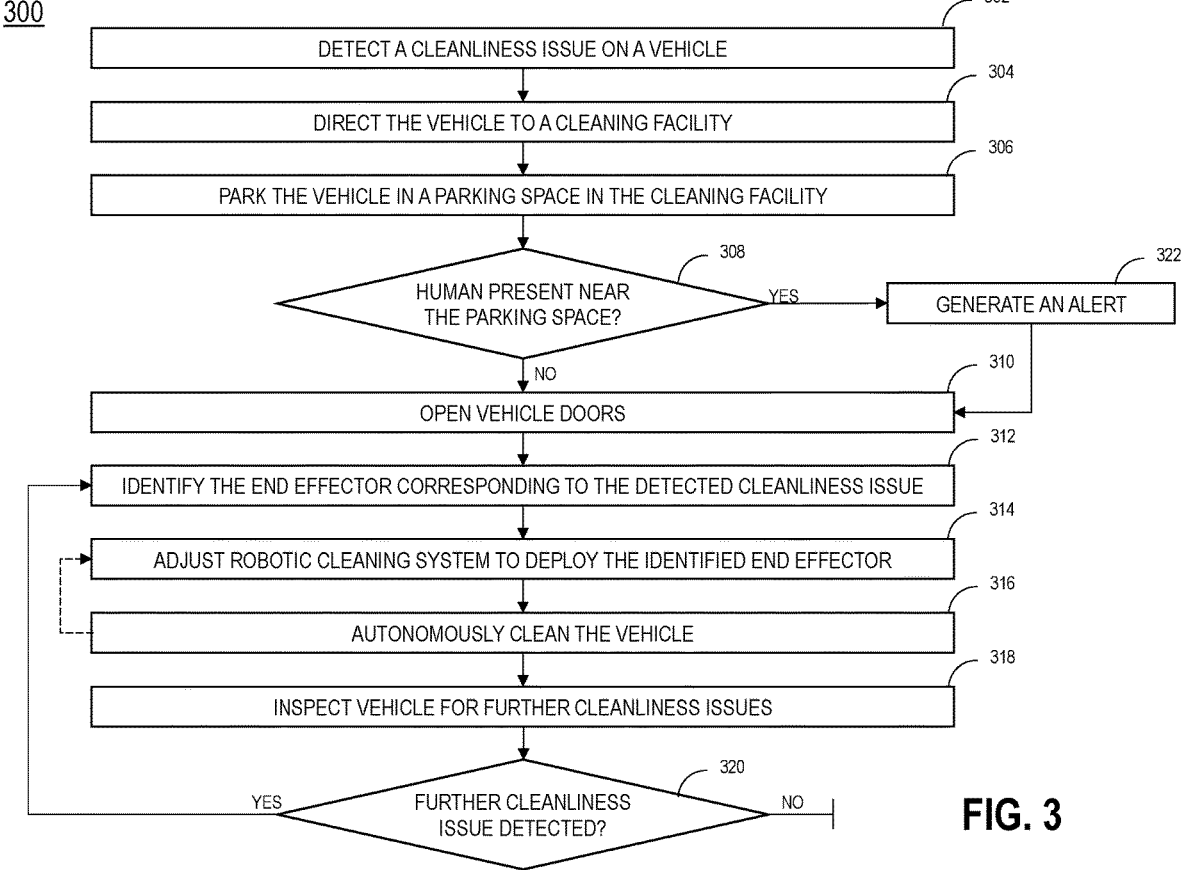
FIG. 3 is a flow chart illustrating a method 300 for automated cleaning, according to some examples of the present disclosure.

FIG. 3 is a flow chart illustrating a method 300 for automated cleaning, according to some examples of the present disclosure. At step 302, a cleanliness issue on a vehicle is detected. The cleanliness issue can include stains or other marks in or on the vehicle, the cleanliness issue can include the detection of trash or other items in the vehicle, and the cleanliness issue can include the detection of dust, dirt, or other dirtiness in the vehicle. The cleanliness issue can be detected using vehicle image sensors, such as interior and exterior vehicle cameras. In some examples, captured images are processed on-vehicle for detection of cleanliness issues. In some examples, captured images are uploaded to a cloud computing system for detection of cleanliness issues. In some examples, captured images are classified according to an area of the vehicle captured in the image. In some examples, captured images are classified according to the type of cleanliness issue detected in the captured image.

In some examples, detecting a cleanliness issue includes determining that a cleanliness issue crosses a selected threshold. For instance, detection of dust, dirt, stains, marks, debris, etc., can become a detected cleanliness issue when the level of detected dust, dirt, stains, marks, debris, etc. crosses a selected threshold. Thus, a certain amount of dirt may be considered acceptable and not a cleanliness issue. Similarly, a small stain may not cross the selected threshold of being a cleanliness issue. In some instances, a larger amount of dirt or a larger stain can itself cross the selected threshold and become a cleanliness issue. In some instances, small levels of various types of potential cleanliness issues (e.g., dust, dirt, stains, marks, debris, etc.) combined together cross the selected threshold and become a cleanliness issue.

In some examples, a cleanliness issue is inferred based on the number of rides the vehicle has provided since its last cleaning. In some examples, a cleanliness issue is inferred based on the amount of time that has passed since its last cleaning. In some examples, a cleanliness issue is inferred based on a bad review left by a passenger following a ride. In some examples, a cleanliness issue is inferred based on a bad review left by a user following a delivery.

At step 304, upon detection of a cleanliness issue at step 302, the vehicle is directed to a cleaning facility by a dispatch system. The vehicle can be an autonomous vehicle that autonomously drives itself to the cleaning facility. In some examples, a routing coordinator directs the autonomous vehicle to a cleaning facility. The dispatch system can identify a cleaning facility with an available parking spot for cleaning, where the parking spot for cleaning is supported by robotic cleaning equipment that is capable of cleaning the cleanliness issues identified at step 302. Similarly, the dispatch system can identify a cleaning facility that is scheduled to have an available adequately equipped parking spot for cleaning at the time the vehicle is predicted to arrive at the cleaning facility. The dispatch system can schedule the vehicle for cleaning in the identified parking spot at the predicted arrival time.

At step 306, the vehicle parks in the identified parking spot in the cleaning facility. In various examples, the vehicle autonomously parks in the identified parking spot in the cleaning facility. The vehicle can be guided by the dispatch system to the identified parking spot. At step 308, it is determined whether any human staffing or personnel are present within the area. In some examples, detection for the presence of human staffing begins when the vehicle enters the cleaning facility. Vehicle sensors can be used for the detection of humans near the vehicle and/or near the identified parking spot. Additionally, cleaning facility sensors can be used to detect the presence of humans near the parking spot. In particular, the parking spot is evaluated for the presence of people near the area of robotic movement and/or near an area a robotic cleaner may operate. If any staff or personnel are detected within the area, at step 322, an alert is generated to notify the staff and/or personnel of the potential robotic movement. The alert can include an audio alert and/or a visual alert. In some examples, robotic movement is paused until the presence of staff and/or personnel is no longer detected, before the method proceeds to step 310.

If no staff or personnel are detected within the area at step 308, the method proceeds to step 310 and the vehicle doors are opened. In some examples, the dispatch system sends a signal to the vehicle commanding the vehicle control module to open doors. In some examples, a robotic cleaner end effector presses a door-opening button (such as a mechanical button on the exterior of the vehicle) causing the corresponding door to open. Once one or more vehicle doors are open, the robotic cleaner can gain access to the vehicle cabin.

At step 312, an end effector corresponding to the detected cleanliness issue is identified. This can include a vacuum end effector or a cleansing end effector. At step 314, the robotic cleaning system is adjusted to deploy the identified end effector. In some examples, the identified end effector is a vacuum nozzle, and the vacuum nozzle is deployed on a vacuum module hose. In some examples, the identified end effector is a cleansing end effector, and the cleansing end effector is deployed as a cleansing module attachment. At step 316, the robotic cleaner autonomously cleans the vehicle to address the detected cleanliness issue. In some examples, at step 312, a sequence of end effectors corresponding to the detected cleanliness issue is identified. When a sequence of end effectors is identified, the method 300 includes adjusting the robotic cleaning system to deploy the identified end effector (step 314), using the robotic cleaner to autonomously clean the vehicle to address the detected cleanliness issue (step 316), and returning to step 314 to adjust the robotic cleaning system to deploy the next identified end effector in the sequence of end effectors.

For instance, the robotic cleaner may begin by vacuuming and configured with a first vacuum nozzle end effector, and then, after vacuuming with the first vacuum nozzle end effector, the vacuum can be reconfigured with a second vacuum nozzle end effector, and vacuuming can be repeated. Similarly, the robotic cleaner can configure the cleansing system with different end effectors and/or different wiping mechanisms, rags, sponges, or brushes. A cleaning spray and/or water can then be applied, dosed by the robotic cleaner based on the type of mark and/or the size of the mark. The selection of cleaning spray can also depend on the type of mark and/or the size of the mark, with cleaning spray options including various cleaning solvents and water. In one example, a detected cleanliness issue may be best serviced with first vacuuming with a selected vacuum end effector, then spraying with cleaning solution using a selected spray system end effector, then scrubbing with a selected cleaning end effector and a scrub brush, then blotting with a selected absorbent cleaning cloth, and then drying with an air dry end effector.

After the detected cleanliness issue has been addressed, at step 318, the vehicle can be inspected for further cleanliness issues. At step 320, it is determined whether any further cleanliness issues were detected. If no further cleanliness issues are detected at step 320, the method 300 ends. If further cleanliness issues are detected at step 320, the method 300 returns to step 312, and an end effector corresponding to the detected cleanliness issue is identified.

In some examples, multiple cleanliness issues are detected before the automated vehicle cleaning begins. If multiple cleanliness issues utilize the same end effector to address the cleanliness issues, the multiple cleanliness issues can be at least partially simultaneously addressed. For example, if multiple cleanliness issues utilize the same vacuum nozzle for cleaning, each of the multiple cleanliness issues can be addressed by the robotic cleaner when the vacuum nozzle end effector is deployed, before a different end effector is deployed for further cleaning of one or more of the multiple cleanliness issues.

If the cleanliness issues are resolved, after cleaning is complete, the vehicle can be dispatched back into normal operation. In some examples, cleanliness issues are not resolved by the robotic cleaner, and the vehicle is dispatched to maintenance following the method 300.

After the cleaning is complete, the vehicle may undergo a post-cleaning automated inspection to identify any further steps to be completed before releasing the vehicle. In some examples, the post-cleaning automated inspection can include the inspection method 400 described with respect to FIG. 4. The post-cleaning automated inspection can be completed by the robotic cleaners. Alternatively, the post-cleaning automated inspection can be completed using vehicle cabin sensors.

Method for Automated Inspections

Figure 4:
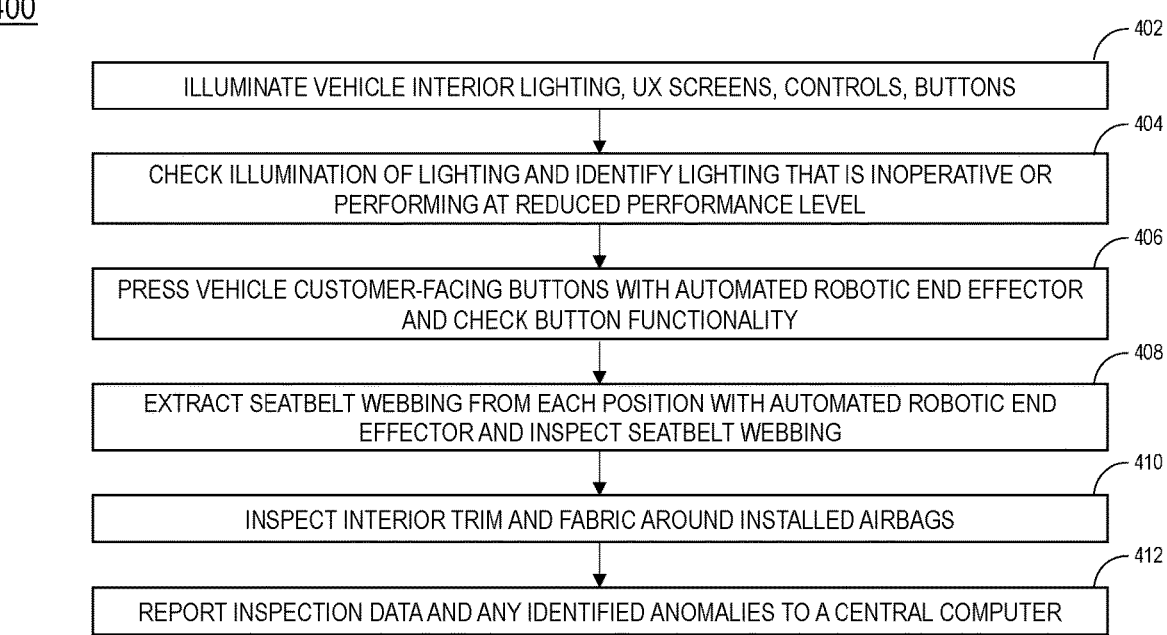
FIG. 4 is a flow chart illustrating a method 400 for automated inspections, according to some examples of the present disclosure.

FIG. 4 is a flow chart illustrating a method 400 for automated inspections, according to some examples of the present disclosure. In various examples, the robotic system 200 described with respect to FIG. 2 can be used to perform automated inspection of on-board equipment. An automated inspection can include inspection of customer-interfacing equipment (windows, door handles, seatbelts, HVAC controls, user interfaces, call buttons, etc.) as well as other vehicle equipment (airbags, defoggers, deicers, windshield wipers, headlights, taillights, brake lights, etc.). In some implementations, the automated inspection method 400 can be performed at regular intervals. In some examples, the automated inspection method 400 is performed concurrently with the automated cleaning method 300. In some examples, the automated inspection method 400 is interleaved with the automated cleaning method 300. In some examples, the automated inspection method 400 is performed while a vehicle is charging.

At step 402, interior vehicle lights are illuminated. In some examples, a remote dispatch command causes interior vehicle lights to be illuminated. In other examples, a robotic end effector activates a manual switch to cause the vehicle to enter an inspection mode, causing a vehicle body control module to illuminate vehicle interior lighting. Vehicle interior lighting can include user interface screens, emergency call buttons, ride stop buttons, HVAC controls, halo, task lamps, etc. At step 404, the illumination of the lighting is checked to identify any lighting that is performing at a reduced performance level or is inoperative. In some examples, the robotic inspector measures the luminosity of various lights and/or lighting.

At step 406, the robotic inspector uses a robotic end effector to press various vehicle buttons and check button functionality. The buttons can be customer-facing buttons such as window opening buttons, door opening buttons, and HVAC control buttons. In some examples, the robotic end effector presses an emergency call button and a test signal is communicated to a dispatch system and/or central computing system for confirmation of functionality. Similarly, the robotic end effector can press a ride stop button and a test signal is communicated to a dispatch system and/or central computing system for confirmation of functionality.

At step 408, the robotic inspector uses a robotic end effector to extract seatbelt webbing from each seating position in the vehicle and inspects the seat belt webbing. In some examples, the robotic inspector includes cameras mounted on the end effector, and the end effector cameras are used to generate images of the seat belt webbing and inspect for damage. In some examples, in-cabin vehicle cameras are used to generate images of the seat belt webbing and inspect for damage. In some examples, the robotic inspector inspects the seat belt webbing for tears, cuts, abrasions, or other damage. The robotic inspector can include an image processor that processes the generated images to identify anomalies and detect damage. After extracting each seat belt webbing, capturing images of the seat belt webbing, and inspecting the seat belt webbing for damage, the robotic inspector allows the seatbelt webbing to retract back into the seatbelt webbing holder for subsequent use.

At step 410, the robotic inspector uses a robotic end effector to inspect interior trim and fabric around the vehicle airbags. In particular, the interior trim and fabric around the vehicle airbags is inspected for any damage that could compromise the integrity of the airbags. The areas inspected can include the area above the windows and/or doors where curtain airbags are contained, and it can include the area to the right of a right hand seat and to the left of a left hand seat where thorax airbags can be contained. In some examples, the robotic inspector includes cameras mounted on the end effector, and the end effector cameras are used to generate images of the interior trim and fabric around the vehicle airbags and inspect for damage. In some examples, in-cabin vehicle cameras are used to generate images of the interior trim and fabric around the vehicle airbags and inspect for damage. In some examples, the robotic inspector inspects the interior trim and fabric around the vehicle airbags for tears, cuts, abrasions, holes, or other damage. The robotic inspector can include an image processor that processes the generated images to identify anomalies and detect damage.

At step 412, the inspection data, including any identified anomalies, is reported to a central computer. The inspection data can include generated images and it can include metadata. In some examples, the damage is identified locally by the inspector robot using on-premises processing. In some examples, the severity of the damage is determined locally by the inspector robot using on-premises processing. In some examples, the inspection data is uploaded to a cloud for image processing, damage detection, and determination of damage severity for any anomalies detected.

In various examples, different vehicle equipment can be inspected by the robotic inspector. Some components that can be inspected include user application communication, cabin microphone, cabin speaker, cabin lighting, passenger task lights, seatback screens, ride stop buttons, emergency call buttons, USB ports, seatbelts, defogger, deicers, window roll-down and roll-up functions, and door opening, closing, and locking functions. Additionally, HVAC functioning can be inspected, including heat, air conditioning, blowers, fans, and various HVAC vents. In some implementations, the severity score of any damage or equipment failure can be dependent on the market in which the vehicle operates. For instance, an air conditioning failure can have a high severity score in a hot climate or during a hot season, while the same air conditioning failure can have a low severity score in a cold climate or during a cold season. In some examples, various equipment failures can result in a vehicle being pulled off the road until the equipment is fixed. For instance, a seat belt failure, an airbag failure, an inoperative headlight, or an inoperative tail light may result in the vehicle going in for maintenance and/or repair before returning to ridehail service.

In some implementations, the various equipment tested is scored, and a log of equipment functioning scores is maintained by the vehicle and/or by a dispatch system, such that the current state of the vehicle is recorded. In some examples, an aggregate equipment functioning score is generated for each vehicle. In some examples, there is a minimum equipment score for a vehicle to operate in a vehicle fleet, in order to maintain a high quality for fleet vehicles.

Robot for Automated Cleaning and Inspections

Figure 5A:
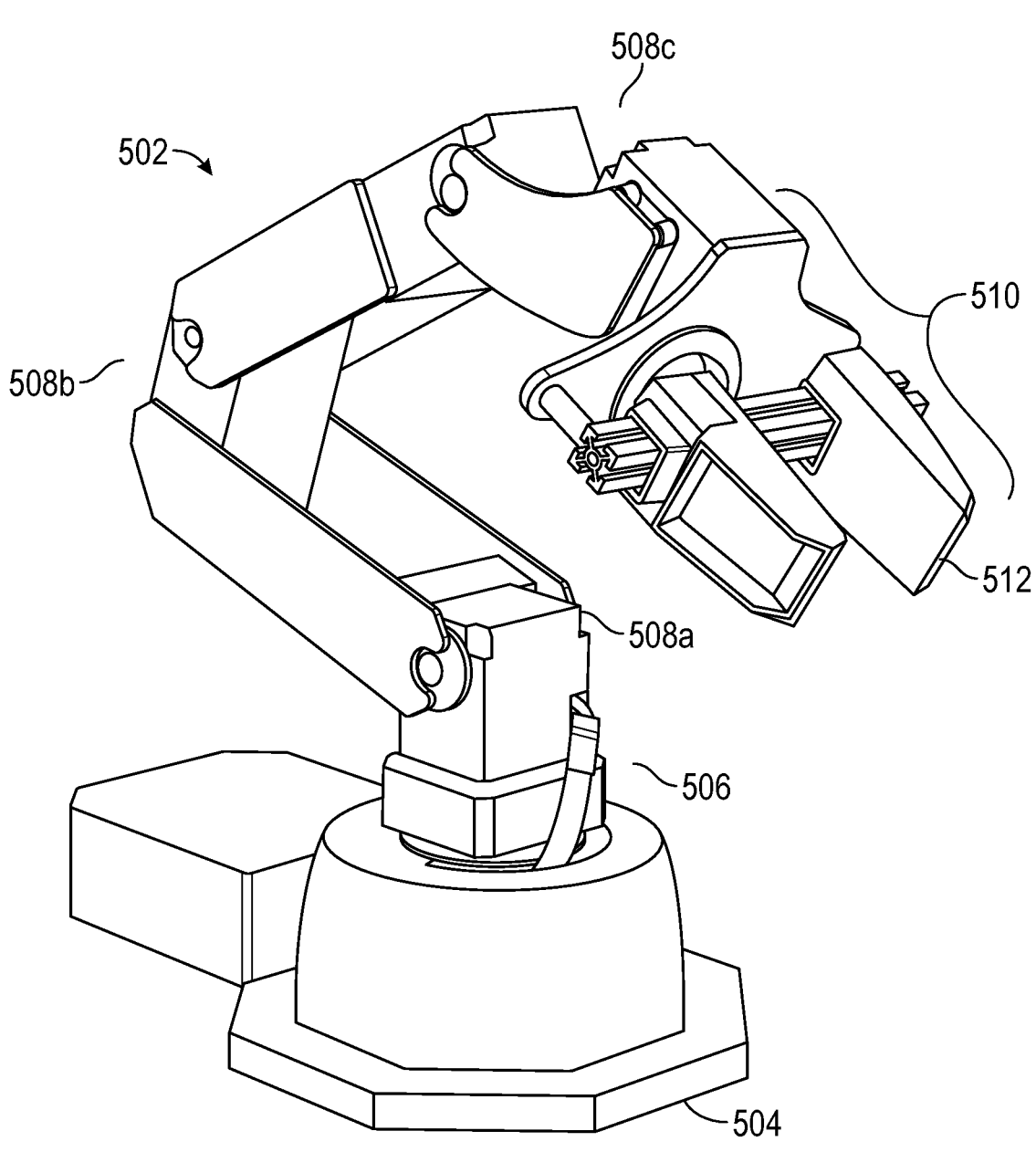
FIGS. 5A, 5B illustrate examples of robotic arms, according to some examples of the present disclosure.

FIG. 5A illustrates an example 500 of a robotic arm 502, according to various examples of the present disclosure. In various examples, the robotic arm 502 can be part of a robotic cleaner. In some examples, the base 504 of robotic arm 502 shown in FIG. 5A is attached to a wheeled base. In some examples, the robotic arm 502 is configured to travel along a track in a charging facility such as an overhead gantry track or floor rail. The robotic arm 502 includes a rotating bottom joint 506, which can rotate 360 degrees, allowing it to rotate to any position around the base 504, and three elbow joints 508*a*, 508*b*, 508*c*. The elbow joints 508*a*, 508*b*, 508*c* allow the head portion 510 of the robotic arm to be at any selected position with respect to the base 504. The head portion 510 of the robotic arm 502 includes a two-prong pincher 512 that can grasp items. In various examples, the two-prong pincher 512 can grasp a cleaning system end effector and use the end effector to clean and/or inspect a vehicle. In some examples, the robotic arm 502 can connect the end effector to various hoses or other systems. In some examples, the two-prong pincher 512 can be used to push a button. In various examples, the head portion 510 can include a different mechanism for grasping and/or holding items. For instance, the head portion 510 can include an electromagnetic head designed to hold an end effector via a magnetic force, where the magnetic force can be turned on to connect to the end effector, and the magnetic force can be turned off to disconnect from the end effector. In another example, the head portion 510 can include a robotic hand, as shown in FIG. 6.

Figure 5B:
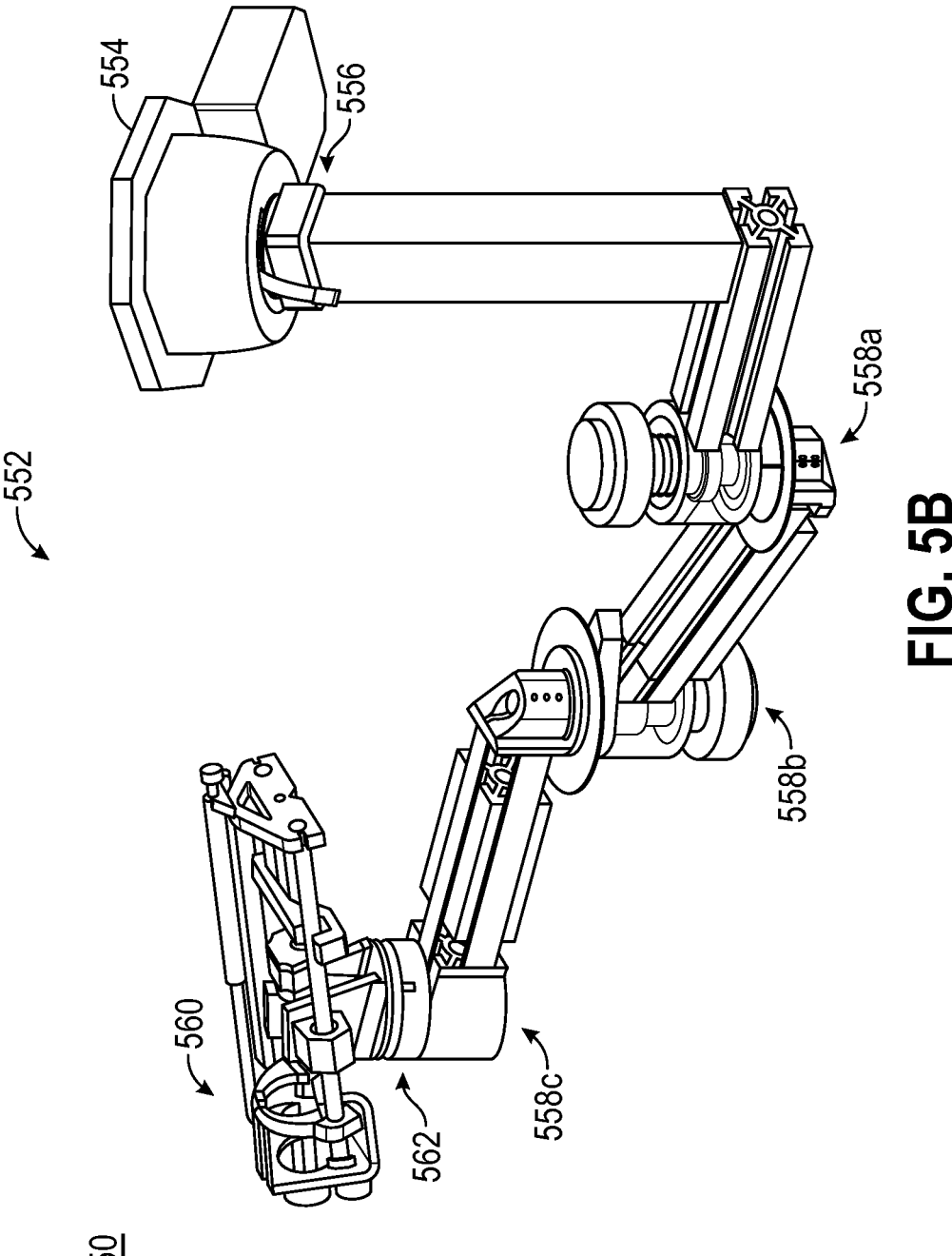

FIG. 5B illustrates an example 550 of a robotic arm 552, according to various examples of the present disclosure. In various examples, the robotic arm 552 can be part of a robotic cleaner. As shown in FIG. 5B, the robotic arm 552 is hanging down from the base 554 such that the track can be an overhead gantry track. In other examples, the robotic arm 552 can be configured to attach to a base that travels along a floor track. In some examples, the base 554 of robotic arm 552 shown in FIG. 5B is attached to a wheeled base. In some examples, the robotic arm 552 is configured to travel along a track in a charging facility such as an overhead gantry track or floor rail. The robotic arm 552 includes a rotating bottom joint 556, which can rotate 360 degrees, allowing it to rotate to any position around the base 554, and three rotating joints 558a, 558b, 558c. The rotating joints 558a, 558b, 558c allow the head portion 560 of the robotic arm 552 to be at any selected position with respect to the base 554. The head portion 560 of the robotic arm 552 can include a mechanism for securing an end effector. In various examples, the head portion 560 can secure a cleaning system end effector and use the end effector to clean and/or inspect a vehicle. In some examples, the robotic arm 552 can connect the end effector to various hoses or other systems. In some examples, the head portion 560 can be used to push a button. In various examples, the head portion 560 can include a different mechanism for grasping and/or holding items. For instance, the head portion 560 can include an electromagnetic head designed to hold an end effector via a magnetic force, where the magnetic force can be turned on to connect to the end effector, and the magnetic force can be turned off to disconnect from the end effector. In another example, the head portion 560 can include a robotic hand, as shown in FIG. 6.

Figure 6:
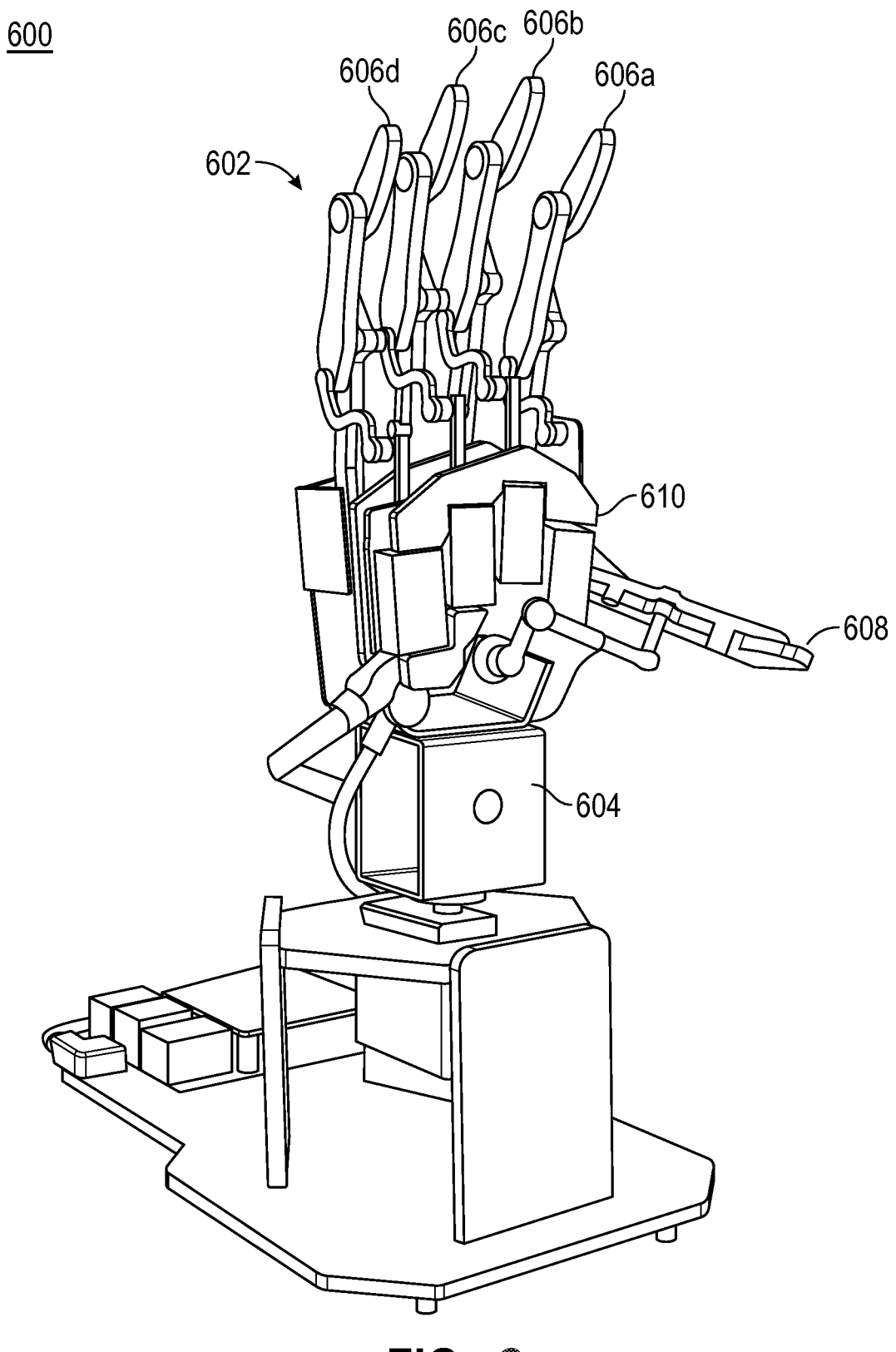
FIG. 6 shows an example of a robotic hand that can be attached to a robotic arm, according to various examples of the present disclosure.

In particular, FIG. 6 shows an example 600 of a robotic hand 602 that can be attached to a robotic arm, according to various examples of the present disclosure. In one example, the robotic arm 502 includes a robotic hand 602 in place of the head portion 510 illustrated in FIG. 5. The robotic hand 602 can clasp items similar to the way a human hand clasps items. The robotic hand 602 includes a wrist portion 604 that can rotate 360 degrees, four finger extensions 606a-606d and one thumb extension 608. Like human fingers, the four finger extensions 606a-606d each have a base joint and two upper joints, allowing them to fold inward toward a center palm area 610 and extend outward. Similarly, the thumb extension 608 has a base joint and two upper joints. In some examples, the robotic hand 602 finger extensions 606a-606d and thumb extension 608 can also be used to press buttons and perform other functions performed by human hands. In some examples, one or more of the finger extensions 606a-606d and thumb extension 608 can include a selectively activated magnet and/or electromagnet to selectively magnetically attach to various items and pick up, move, and/or disengage from the items.

Figure 7:
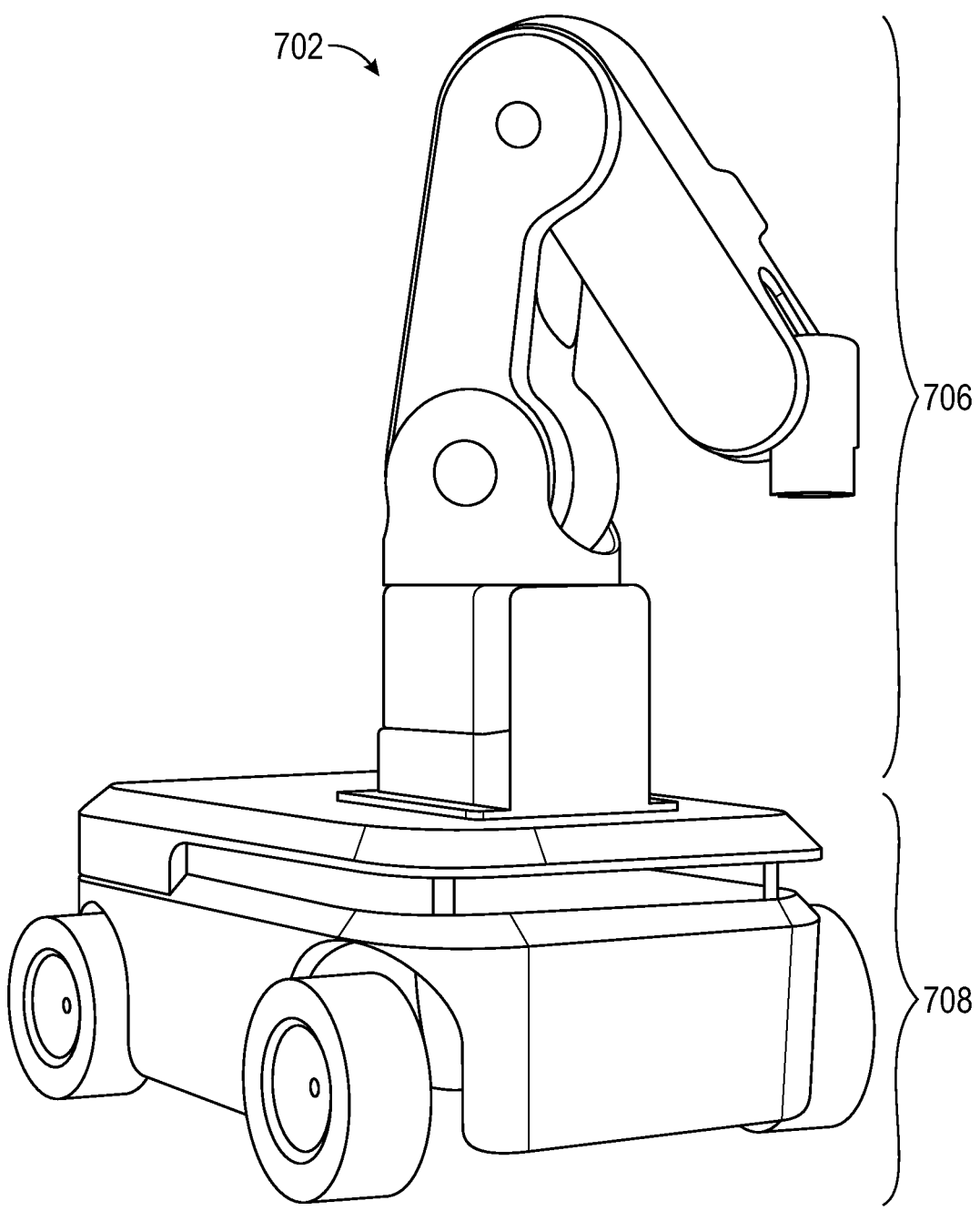
FIG. 7 shows an example of an autonomous ground-based robot, according to various examples of the present disclosure.

In some implementations, a cleaning and/or inspection facility system includes a ground-based robot that can move from vehicle to vehicle without following along a track. For instance, the ground-based robot can be an AGV, and it can be an R2D2-style robot. FIG. 7 shows an example 700 of an autonomous ground-based robot 702, according to various examples of the present disclosure. The ground-based robot 702 includes a wheeled base that allows the ground-based robot 702 to travel around a vehicle facility. In various examples, the ground-based robot 702 is not restricted to travel along a pre-existing rail and can maneuver around the charging facility. The ground-based robot 702 includes a wheeled base portion 704 and a robotic arm portion 706. The ground-based robot can be configured with any selected robotic arm attached to the wheeled base portion 704. For example, the robotic arm 702 shown in FIG. 7 can be attached to the wheeled base portion 704. Similarly, the robotic hand 602 can be attached to the robotic arm portion 706, and the robotic hand 602 can be attached to any selected robotic arm on the wheeled base portion 704. The ground-based robot 702 can include integrated sensors for navigating around a vehicle facility. In some examples, the ground-based robot 702 includes one or more of LIDAR sensors, RADAR sensors, and image sensors.

Example of an Autonomous Vehicle Fleet

Figure 8:
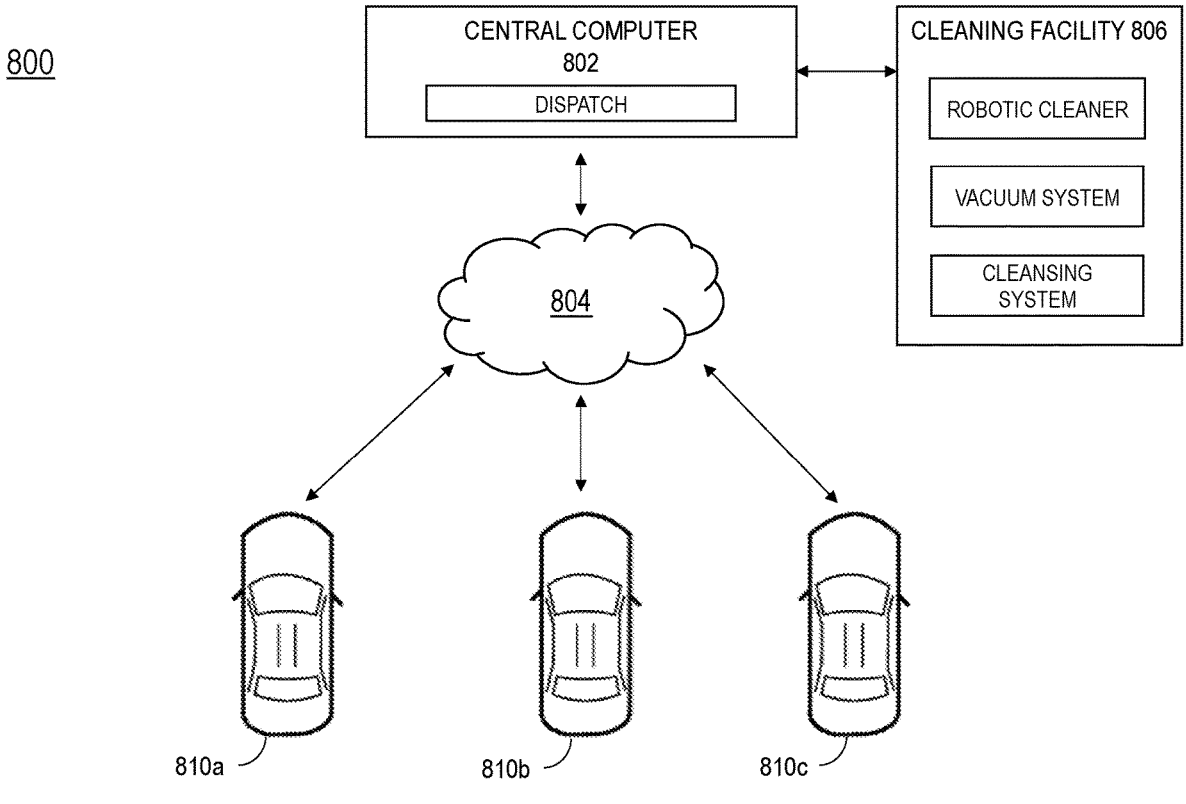
FIG. 8 is a diagram illustrating a fleet of autonomous vehicles in communication with a central computer, according to some embodiments of the disclosure.

FIG. 8 is a diagram 800 illustrating a fleet of autonomous vehicles 810a, 810b, 810c in communication with a central computer 802, according to some embodiments of the disclosure. The vehicles 810a-810c communicate wirelessly with a cloud 804 and a central computer 802. The central computer 802 includes a routing coordinator, a dispatch service, and a database of information from the vehicles 810a-810c in the fleet. In some examples, the database of information can include a state of cleanliness of each vehicle as well as other vehicle conditions and information. Autonomous vehicle fleet routing refers to the routing of multiple vehicles in a fleet. The central computer 802 also communicates with various fleet charging facilities such as the charging facility 806. In some examples, vehicles 810a-810c can communicate a cleaning request with a dispatch system at the central computer. When a vehicle 810a-810c transmits a cleaning request, the dispatch system can route the vehicle 810a-810c to a cleaning facility 806. In some examples, the dispatch system can provide the cleaning facility 806 with Additionally, the dispatch system can provide the cleaning facility 806 with the time at which the vehicle 810a-810c will arrive at the cleaning facility 806, and the cleaning facility 806 can identify a parking spot for the vehicle 810a-810c. In some examples, the cleaning facility 806 can communicate the identified parking spot with the dispatch system and/or with the vehicle 810a-810c.

As described above, each vehicle 810a-810c in the fleet of vehicles communicates with a routing coordinator. Thus, information gathered by various autonomous vehicles 810a-810c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, the routing coordinator uses collected position data corresponding to emergency events to generate a best route for an autonomous vehicle to avoid a potential emergency situation and associated unknowns. In some examples, the routing coordinator generates a route for a vehicle to the charging facility 806. In some examples, a vehicle has one or more scheduled stops before embarking on its route to the charging facility 806.

Example Autonomous Vehicle (AV) Management System

Figure 9:
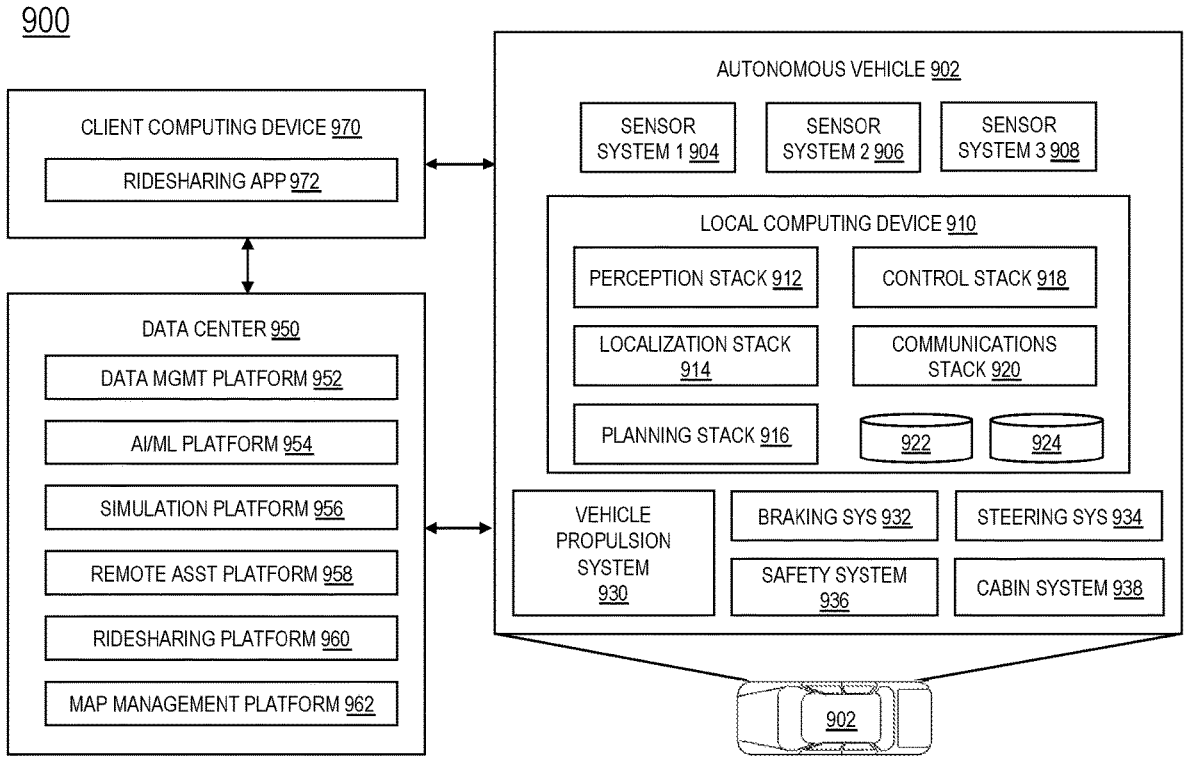
FIG. 9 illustrates an example system environment that can be used to facilitate autonomous vehicle (AV) dispatch and operations, according to some aspects of the disclosed technology.

Turning now to FIG. 9, this figure illustrates an example of an AV management system 900. One of ordinary skill in the art will understand that, for the AV management system 900 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 900 includes an AV 902, a data center 950, and a client computing device 970. The AV 902, the data center 950, and the client computing device 970 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 902 can navigate about roadways without a human driver based on sensor signals generated by multiple sensor systems 904, 906, and 908. The sensor systems 904-908 can include different types of sensors and can be arranged about the AV 902. For instance, the sensor systems 904-908 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 904 can be a camera system, the sensor system 906 can be a LIDAR system, and the sensor system 908 can be a RADAR system. Other embodiments may include any other number and type of sensors.

In some examples, the AV 902 includes an image processor, configured to receive captured images from AV sensors and detect cleanliness issues. In some examples, the AV 902 includes a charging port door sensor, which can be used to trigger the AV 902 to unlock and/or open the charging port door. For instance, if the charging port door sensor senses a robotic arm and/or a charging station plug, the AV 902 can use the sensed data to identify the presence of the robotic arm and/or charging station plug and unlock and/or autonomously open the charging port door. In some examples, the sensed data from the charging port door sensor is transmitted to the local computing device 910, which uses the sensed data to identify the presence of the robotic arm and/or the charging station plug.

AV 902 can also include several mechanical systems that can be used to maneuver or operate AV 902. For instance, the mechanical systems can include vehicle propulsion system 930, braking system 932, steering system 934, safety system 936, and cabin system 938, among other systems. Vehicle propulsion system 930 can include an electric motor, an internal combustion engine, or both. The braking system 932 can include an engine brake, a wheel braking system (e.g., a disc braking system that utilizes brake pads), hydraulics, actuators, and/or any other suitable componentry configured to assist in decelerating AV 902. The steering system 934 can include suitable componentry configured to control the direction of movement of the AV 902 during navigation. Safety system 936 can include lights and signal indicators, a parking brake, airbags, and so forth. The cabin system 938 can include cabin temperature control systems, in-cabin entertainment systems, and so forth. In some embodiments, the AV 902 may not include human driver actuators (e.g., steering wheel, handbrake, foot brake pedal, foot accelerator pedal, turn signal lever, window wipers, etc.) for controlling the AV 902. Instead, the cabin system 938 can include one or more client interfaces (e.g., Graphical User Interfaces (GUIs), Voice User Interfaces (VUIs), etc.) for controlling certain aspects of the mechanical systems 930-938.

AV 902 can additionally include a local computing device 910 that is in communication with the sensor systems 904-908, the mechanical systems 930-938, the data center 950, and the client computing device 970, among other systems. The local computing device 910 can include one or more processors and memory, including instructions that can be executed by the one or more processors. The instructions can make up one or more software stacks or components responsible for controlling the AV 902; communicating with the data center 950, the client computing device 970, and other systems; receiving inputs from riders, passengers, and other entities within the AV's environment; logging metrics collected by the sensor systems 904-908; and so forth. In this example, the local computing device 910 includes a perception stack 912, a mapping and localization stack 914, a planning stack 916, a control stack 918, a communications stack 920, a High Definition (HD) geospatial database 922, and an AV operational database 924, among other stacks and systems.

Perception stack 912 can enable the AV 902 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 904-908, the mapping and localization stack 914, the HD geospatial database 922, other components of the AV, and other data sources (e.g., the data center 950, the client computing device 970, third-party data sources, etc.). The perception stack 912 can detect and classify objects and determine their current and predicted locations, speeds, directions, and the like. In addition, the perception stack 912 can determine the free space around the AV 902 (e.g., to maintain a safe distance from other objects, change lanes, park the AV, etc.). The perception stack 912 can also identify environmental uncertainties, such as where to look for moving objects, flag areas that may be obscured or blocked from view, and so forth.

Mapping and localization stack 914 can determine the AV's position and orientation (pose) using different methods from multiple systems (e.g., GPS, IMUs, cameras, LIDAR, RADAR, ultrasonic sensors, the HD geospatial database 922, etc.). For example, in some embodiments, the AV 902 can compare sensor data captured in real-time by the sensor systems 904-908 to data in the HD geospatial database 922 to determine its precise (e.g., accurate to the order of a few centimeters or less) position and orientation. The AV 902 can focus its search based on sensor data from one or more first sensor systems (e.g., GPS) by matching sensor data from one or more second sensor systems (e.g., LIDAR). If the mapping and localization information from one system is unavailable, the AV 902 can use mapping and localization information from a redundant system and/or from remote data sources.

The planning stack 916 can determine how to maneuver or operate the AV 902 safely and efficiently in its environment. For example, the planning stack 916 can receive the location, speed, and direction of the AV 902, geospatial data, data regarding objects sharing the road with the AV 902 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 902 from one point to another. The planning stack 916 can determine multiple sets of one or more mechanical operations that the AV 902 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 916 can select from multiple backup plans to carry out. For example, while preparing to change lanes to turn right at an intersection, another vehicle may aggressively cut into the destination lane, making the lane change unsafe. The planning stack 916 could have already determined an alternative plan for such an event, and upon its occurrence, help to direct the AV 902 to go around the block instead of blocking a current lane while waiting for an opening to change lanes.

The control stack 918 can manage the operation of the vehicle propulsion system 930, the braking system 932, the steering system 934, the safety system 936, and the cabin system 938. The control stack 918 can receive sensor signals from the sensor systems 904-908 as well as communicate with other stacks or components of the local computing device 910 or a remote system (e.g., the data center 950) to effectuate operation of the AV 902. For example, the control stack 918 can implement the final path or actions from the multiple paths or actions provided by the planning stack 916. This can involve turning the routes and decisions from the planning stack 916 into commands for the actuators that control the AV's steering, throttle, brake, and drive unit.

The communication stack 920 can transmit and receive signals between the various stacks and other components of the AV 902 and between the AV 902, the data center 950, the client computing device 970, and other remote systems. The communication stack 920 can enable the local computing device 910 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 920 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 922 can store HD maps and related data of the streets upon which the AV 902 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 924 can store raw AV data generated by the sensor systems 904-908 and other components of the AV 902 and/or data received by the AV 902 from remote systems (e.g., the data center 950, the client computing device 970, etc.). In some embodiments, the raw AV data can include HD LIDAR point cloud data, image or video data, RADAR data, GPS data, and other sensor data that the data center 950 can use for creating or updating AV geospatial data as discussed further below with respect to FIG. 10 and elsewhere in the present disclosure.

The data center 950 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 950 can include one or more computing devices remote to the local computing device 910 for managing a fleet of AVs and AV-related services. For example, in addition to managing the AV 902, the data center 950 may also support a ridesharing service, a delivery service, a remote/roadside assistance service, street services (e.g., street mapping, street patrol, street cleaning, street metering, parking reservation, etc.), and the like.

The data center 950 can send and receive various signals to and from the AV 902 and the client computing device 970. These signals can include sensor data captured by the sensor systems 904-908, roadside assistance requests, software updates, ridesharing pick-up and drop-off instructions, and so forth. In this example, the data center 950 includes one or more of a data management platform 952, an Artificial Intelligence/Machine Learning (AI/ML) platform 954, a simulation platform 956, a remote assistance platform 958, a ridesharing platform 960, and a map management platform 962, among other systems.

Data management platform 952 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 950 can access data stored by the data management platform 952 to provide their respective services.

The AI/ML platform 954 can provide the infrastructure for training and evaluating machine learning algorithms for operating the AV 902, the simulation platform 956, the remote assistance platform 958, the ridesharing platform 960, the map management platform 962, and other platforms and systems. Using the AI/ML platform 954, data scientists can prepare data sets from the data management platform 952; select, design, and train machine learning models; evaluate, refine, and deploy the models; maintain, monitor, and retrain the models; and so on.

The simulation platform 956 can enable testing and validation of the algorithms, machine learning models, neural networks, and other development efforts for the AV 902, the remote assistance platform 958, the ridesharing platform 960, the map management platform 962, and other platforms and systems. The simulation platform 956 can replicate a variety of driving environments and/or reproduce real-world scenarios from data captured by the AV 902, including rendering geospatial information and road infrastructure (e.g., streets, lanes, crosswalks, traffic lights, stop signs, etc.) obtained from the map management platform 962; modeling the behavior of other vehicles, bicycles, pedestrians, and other dynamic elements; simulating inclement weather conditions, different traffic scenarios; and so on.

The remote assistance platform 958 can generate and transmit instructions regarding the operation of the AV 902. For example, in response to an output of the AI/ML platform 954 or other system of the data center 950, the remote assistance platform 958 can prepare instructions for one or more stacks or other components of the AV 902.

The ridesharing platform 960 can interact with a customer of a ridesharing service via a ridesharing application 972 executing on the client computing device 970. The client computing device 970 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 972. The client computing device 970 can be a customer's mobile computing device or a computing device integrated with the AV 902 (e.g., the local computing device 910). The ridesharing platform 960 can receive requests to be picked up or dropped off from the ridesharing application 972 and dispatch the AV 902 for the trip.

Map management platform 962 can provide a set of tools for the manipulation and management of geographic and spatial (geospatial) and related attribute data. The data management platform 952 can receive LIDAR point cloud data, image data (e.g., still image, video, etc.), RADAR data, GPS data, and other sensor data (e.g., raw data) from one or more AVs 902, Unmanned Aerial Vehicles (UAVs), satellites, third-party mapping services, and other sources of geospatially referenced data. The raw data can be processed, and map management platform 962 can render base representations (e.g., tiles (2D), bounding volumes (3D), etc.) of the AV geospatial data to enable users to view, query, label, edit, and otherwise interact with the data. Map management platform 962 can manage workflows and tasks for operating on the AV geospatial data. Map management platform 962 can control access to the AV geospatial data, including granting or limiting access to the AV geospatial data based on user-based, role-based, group-based, task-based, and other attribute-based access control mechanisms. Map management platform 962 can provide version control for the AV geospatial data, such as to track specific changes that (human or machine) map editors have made to the data and to revert changes when necessary. Map management platform 962 can administer release management of the AV geospatial data, including distributing suitable iterations of the data to different users, computing devices, AVs, and other consumers of HD maps. Map management platform 962 can provide analytics regarding the AV geospatial data and related data, such as to generate insights relating to the throughput and quality of mapping tasks.

In some embodiments, the map viewing services of map management platform 962 can be modularized and deployed as part of one or more of the platforms and systems of the data center 950. For example, the AI/ML platform 954 may incorporate the map viewing services for visualizing the effectiveness of various object detection or object classification models, the simulation platform 956 may incorporate the map viewing services for recreating and visualizing certain driving scenarios, the remote assistance platform 958 may incorporate the map viewing services for replaying traffic incidents to facilitate and coordinate aid, the ridesharing platform 960 may incorporate the map viewing services into the client application 972 to enable passengers to view the AV 902 in transit en route to a pick-up or drop-off location, and so on.

Example Processing System

Figure 10:
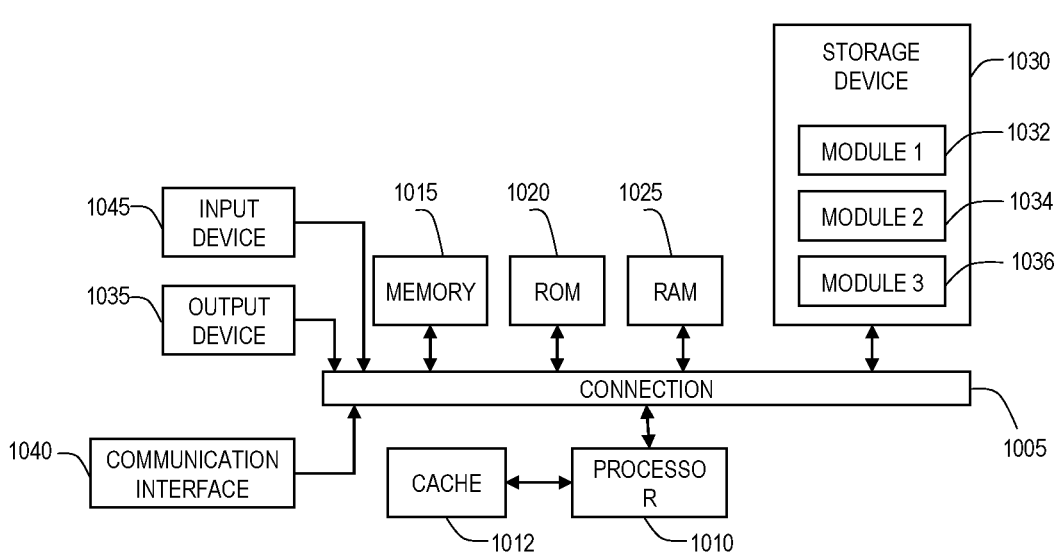
FIG. 10 illustrates an example processor-based system with which some aspects of the subject technology can be implemented.

FIG. 10 illustrates an example processor-based system with which some aspects of the subject technology can be implemented. For example, processor-based system 1000 can be any computing device making up, or any component thereof in which the components of the system are in communication with each other using connection 1005. In some examples, the processor-based system 1000 is in an autonomous vehicle. In some examples, the processor-based system, 1000 is in a robot and/or in a robotic arm. In some examples, the processor-based system is in a robotic cleaner, and/or the processor-based system is in a cleaning facility. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (Central Processing Unit (CPU) or processor) 1010 and connection 1005 that couples various system components including system memory 1015, such as Read-Only Memory (ROM) 1020 and Random-Access Memory (RAM) 1025 to processor 1010. Computing system 1000 can include a cache of high-speed memory 1012 connected directly with, in close proximity to, or integrated as part of processor 1010.

Processor 1010 can include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 1030 can include software services, servers, services, etc., that when the code that defines such software is executed by the processor 1010, it causes the system 1000 to perform a function. In some embodiments, a hardware service that performs a particular function can include the software component stored in a computer-readable medium in connection with the necessary hardware components, such as processor 1010, connection 1005, output device 1035, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a method for vehicle cleaning, comprising: autonomously detecting a first cleanliness issue on a vehicle; parking the vehicle in a parking spot in a cleaning facility, wherein the parking spot is autonomously accessible by a robotic cleaner; identifying a first cleaning end effector corresponding to the first cleanliness issue; adjusting the robotic cleaner to deploy the first cleaning end effector; autonomously cleaning the vehicle using the robotic cleaner and the first end effector, wherein autonomously cleaning includes addressing the first cleanliness issue; and inspecting the vehicle for a second cleanliness issue.

Example 2 provides a method, system, and/or vehicle according to one or more of the preceding and/or following examples, wherein autonomously detecting the first cleanliness issue includes receiving images from vehicle image sensors and processing the images at an image processor to identify the first cleanliness issue.

Example 3 provides a method, system, and/or vehicle according to one or more of the preceding and/or following examples, wherein processing the images at the image processor includes processing the images at a vehicle onboard computer, wherein inspecting the vehicle includes inspecting the vehicle using the robotic cleaner, and further comprising autonomously detecting, by the robotic cleaner, a second cleanliness issue on the vehicle.

Example 4 provides a method, system, and/or vehicle according to one or more of the preceding and/or following examples, identifying a sequence of end effectors for addressing the first cleanliness issue, wherein the sequence of end effectors includes the first cleaning end effector and a second cleaning end effector; adjusting the robotic cleaner to deploy the second cleaning end effector; and autonomously cleaning the vehicle using the robotic cleaner and the second end effector.

Example 5 provides a method, system, and/or vehicle according to one or more of the preceding and/or following examples, wherein adjusting the robotic cleaner to deploy the first cleaning end effector includes connecting a vacuum end effector to a vacuum tube for vacuuming the vehicle, and wherein adjusting the robotic cleaner to deploy the second cleaning end effector includes using a cleansing end effector for one of spraying, wiping, and scrubbing the vehicle.

Example 6 provides a method, system, and/or vehicle according to one or more of the preceding and/or following examples, further comprising identifying the cleaning facility having the parking spot available, and directing the vehicle to the cleaning facility.

Example 7 provides a method, system, and/or vehicle according to one or more of the preceding and/or following examples, further comprising evaluating the area around the vehicle in the parking spot for a presence of a human, and, when the presence of the human is detected, generating an alarm to alert the human of the robotic cleaner.

Example 8 provides a method, system, and/or vehicle according to one or more of the preceding and/or following examples, further comprising autonomously connecting the vehicle with a charging station, and wherein autonomously cleaning the vehicle occurs while charging the vehicle.

Example 9 provides a system for automated vehicle cleaning, comprising: a plurality of parking spots; a robotic cleaner, wherein the robotic cleaner has access to a vacuum system and a cleansing system, and wherein the robotic cleaner is configured to autonomously clean a vehicle in at least one of the parking spots; a vacuum system including a plurality of vacuum system end effectors configured for deployment by the robotic cleaner to vacuum at least a portion of the vehicle; and a cleansing system including a plurality of cleansing system end effectors configured for deployment by the robotic cleaner to cleanse at least a portion of the vehicle; wherein the robotic cleaner is configured to identify at least one of a vacuum system end effector and a cleansing system end effector corresponding to a vehicle cleanliness issue.

Example 10 provides a method, system, and/or vehicle according to one or more of the preceding and/or following examples, wherein the robotic cleaner is configured to inspect the vehicle for the cleanliness issue and to identify the cleanliness issue.

Example 11 provides a method, system, and/or vehicle according to one or more of the preceding and/or following examples, wherein the vacuum system includes a vacuum hose coupled to a vacuum canister, wherein the vacuum canister is configured to collect vacuumed debris via the vacuum hose, and wherein the robotic cleaner is configured to couple ones of the plurality of vacuum system end effectors to the vacuum hose.

Example 12 provides a method, system, and/or vehicle according to one or more of the preceding and/or following examples, wherein further comprising a plurality of reservoirs coupled to the cleansing system, wherein each of the plurality of reservoirs holds a cleaning solution.

Example 13 provides a method, system, and/or vehicle according to one or more of the preceding and/or following examples, further comprising a water hose coupled to the cleansing system wherein the robotic cleaner is configured to access water from the water hose.

Example 14 provides a method, system, and/or vehicle according to one or more of the preceding and/or following examples, wherein the robotic cleanser further comprises an image processor configured to process vehicle images to identify the cleanliness issue.

Example 15 provides a method, system, and/or vehicle according to one or more of the preceding and/or following examples, wherein the robotic cleaner is a first robotic cleaner and further comprising a plurality of robotic cleaners, wherein each of the plurality of robotic cleaners has at least one corresponding parking space.

Example 16 provides a method, system, and/or vehicle according to one or more of the preceding and/or following examples, wherein the robotic cleaner is a mobile robotic cleaner configured to autonomously travel to the parking spot.

Example 17 provides system for automated fleet cleaning, comprising: a plurality of fleet vehicles; a dispatch service in communication with each of the plurality of fleet vehicles, wherein the dispatch service is configured to: receive a cleaning request from a fleet vehicle of the plurality of fleet vehicles, identify a cleaning facility with an available parking spot for cleaning, and transmit a message indicating that the fleet vehicle is arriving at the identified cleaning facility at a first time; the cleaning facility, including: a plurality of parking spots; a robotic cleaner, wherein the robotic cleaner has access to a vacuum system and a cleansing system, and wherein the robotic cleaner is configured to autonomously clean the fleet vehicle parked in at least one of the plurality of parking spots; a vacuum system including a plurality of vacuum system end effectors configured for deployment by the robotic cleaner to vacuum at least a portion of the fleet vehicle; and a cleansing system including a plurality of cleansing system end effectors configured for deployment by the robotic cleaner to cleanse at least a portion of the fleet vehicle; wherein the robotic cleaner is configured to identify at least one of a vacuum system end effector and a cleansing system end effector corresponding to a vehicle cleanliness issue.

Example 18 provides a method, system, and/or vehicle according to one or more of the preceding and/or following examples, wherein the fleet vehicle is configured to identify a first cleanliness issue, and wherein the robotic cleaner is configured to receive the first cleanliness issue and identify at least one of a vacuum system end effector and a cleansing system end effector to address the first cleaning issue.

Example 19 provides a method, system, and/or vehicle according to one or more of the preceding and/or following examples, wherein the vacuum system further comprises a vacuum canister and a vacuum hose, wherein the vacuum canister is configured to collect vacuumed debris via the vacuum hose, and wherein the robotic cleaner is configured to couple ones of the plurality of vacuum system end effectors to the vacuum hose.

Example 20 provides a method, system, and/or vehicle according to one or more of the preceding and/or following examples, wherein the cleansing system further comprises a plurality of reservoirs, wherein each of the plurality of reservoirs holds a cleaning solution.

Example 21 provides a method, system, and/or vehicle according to one or more of the preceding and/or following examples, wherein each of the fleet vehicle includes vehicle image sensors and an image processor, and wherein the fleet vehicle receives images from vehicle image sensors and processes the images at the image processor to identify the first cleanliness issue.

Example 22 provides a method for automated vehicle inspections, comprising: illuminating vehicle lighting; inspecting, with a robotic inspector, illumination of lighting and identifying at least one lighting module that is performing at a reduced performance level; pressing vehicle buttons with the robotic inspector and checking button functionality; extracting seatbelt webbing with the robotic inspector and inspecting seat belt webbing; inspecting, with the robotic inspector, interior trim and interior fabric around vehicle airbags; and logging inspection data including identified anomalies.

Example 23 provides a method, system, and/or vehicle according to one or more of the preceding and/or following examples, transmitting the inspection data to a central computer.

Example 24 provides a method, system, and/or vehicle according to one or more of the preceding and/or following examples, wherein illuminating vehicle lighting includes causing vehicle lighting to illuminate through actions of the autonomous robotic inspector.

Example 25 provides a method, system, and/or vehicle according to one or more of the preceding and/or following examples, illuminating vehicle lighting includes transmitting a message to the vehicle instructing the vehicle to illuminate vehicle lighting.

Example 26 provides a method, system, and/or vehicle according to one or more of the preceding and/or following examples, further comprising receiving a message from dispatch.

Example 27 provides a system for automated vehicle inspections, comprising: a robotic inspector configured to inspect illumination of vehicle lighting and identify at least one lighting module that is performing at a reduced performance level, press vehicle buttons and check button functionality, extract vehicle seatbelt webbing and inspect seatbelt webbing, inspect interior trim and interior fabric around vehicle airbags, and log inspection data including identified anomalies.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system for fleet cleaning of a plurality of fleet vehicles, comprising:

a dispatch service configured to communicate with each of the plurality of fleet vehicles, wherein the dispatch service is configured to:

receive a cleaning request from a fleet vehicle of the plurality of fleet vehicles;

identify a cleaning facility with an available parking spot for cleaning; and transmit a message indicating that the fleet vehicle is arriving at the identified cleaning facility at a first time; and the cleaning facility, including:

a plurality of parking spots;

a robotic cleaner, wherein the robotic cleaner has access to a vacuum system and a cleansing system, and wherein the robotic cleaner is configured to clean the fleet vehicle parked in at least one of the plurality of parking spots;

the vacuum system including a plurality of vacuum system end effectors configured for deployment by the robotic cleaner to vacuum at least a portion of the fleet vehicle; and the cleansing system including a plurality of cleansing system end effectors configured for deployment by the robotic cleaner to cleanse at least a portion of the fleet vehicle, wherein the robotic cleaner is configured to identify at least one of a vacuum system end effector and a cleansing system end effector corresponding to a vehicle cleanliness issue, and wherein the robotic cleaner is configured to open a door of the fleet vehicle to access a vehicle interior and autonomously clean the vehicle interior using the identified at least one of the vacuum system end effector and the cleansing system end effector.

2. The system of claim 1, wherein the fleet vehicle comprises a vehicle sensor and an onboard computer, wherein the onboard computer is configured to identify the vehicle cleanliness issue based on data from the vehicle sensor, wherein the cleaning request includes the vehicle cleanliness issue, and wherein the robotic cleaner is configured to receive the vehicle cleanliness issue.

3. The system of claim 1, wherein the vacuum system further comprises a vacuum canister and a vacuum hose, wherein the vacuum canister is configured to collect vacuumed debris via the vacuum hose, and wherein the robotic cleaner is configured to couple ones of the plurality of vacuum system end effectors to the vacuum hose.

4. The system of claim 1, wherein the cleansing system further comprises a plurality of reservoirs, wherein each of the plurality of reservoirs holds a cleaning solution.

5. A system for vehicle cleaning, comprising:

a plurality of parking spots;

a robotic cleaner, wherein the robotic cleaner has access to a vacuum system and a cleansing system, and wherein the robotic cleaner is configured to clean a vehicle in at least one of the parking spots;

the vacuum system including a plurality of vacuum system end effectors configured for deployment by the robotic cleaner to vacuum at least a portion of the vehicle; and the cleansing system including a plurality of cleansing system end effectors configured for deployment by the robotic cleaner to cleanse at least a portion of the vehicle;

wherein the robotic cleaner is configured to identify at least one of a vacuum system end effector and a cleansing system end effector corresponding to a vehicle cleanliness issue; and wherein the robotic cleaner is configured to open a door of the vehicle to access a vehicle interior and autonomously clean the vehicle interior using the identified at least one of the vacuum system end effector and the cleansing system end effector.

6. The system of claim 5, wherein the robotic cleaner is configured to inspect the vehicle for the cleanliness issue and to identify the cleanliness issue.

7. The system of claim 6, wherein the vacuum system includes a vacuum hose coupled to a vacuum canister, wherein the vacuum canister is configured to collect vacuumed debris via the vacuum hose, and wherein the robotic cleaner is configured to couple ones of the plurality of vacuum system end effectors to the vacuum hose.

8. The system of claim 6, further comprising a plurality of reservoirs coupled to the cleansing system, wherein each of the plurality of reservoirs holds a cleaning solution.

9. The system of claim 8, further comprising a water hose coupled to the cleansing system wherein the robotic cleaner is configured to access water from the water hose.

10. The system of claim 5, wherein the robotic cleaner further comprises a camera configured to capture vehicle images, and an image processor configured to process the captured vehicle images to identify the cleanliness issue.

11. The system of claim 5, wherein the robotic cleaner is a first robotic cleaner and further comprising a plurality of additional robotic cleaners, wherein each of the additional plurality of robotic cleaners is associated with at least one corresponding parking spot.

12. The system of claim 5, wherein the robotic cleaner is a mobile robotic cleaner configured to travel to the parking spot.

* * * * *